(12) United States Patent
Ady et al.

(10) Patent No.: US 7,011,564 B2
(45) Date of Patent: Mar. 14, 2006

(54) WILD GAME CALL

(75) Inventors: Daniel D. Ady, Nampa, ID (US); Don Laubach, Gardiner, MT (US)

(73) Assignee: Donald R. Laubach, Gardiner, MT (US)

(*) Notice: Subject to any disclaimer, the term of this patent is extended or adjusted under 35 U.S.C. 154(b) by 0 days.

(21) Appl. No.: 10/894,976

(22) Filed: Jul. 19, 2004

(65) Prior Publication Data

US 2005/0059318 A1 Mar. 17, 2005

Related U.S. Application Data

(60) Provisional application No. 60/561,215, filed on Apr. 9, 2004, provisional application No. 60/488,509, filed on Jul. 18, 2003.

(51) Int. Cl.
*A63H 5/00* (2006.01)

(52) U.S. Cl. ..................... 446/207; 446/209

(58) Field of Classification Search ........ 446/207–209; 84/382, 383 A, 383 R, 330
See application file for complete search history.

(56) References Cited

U.S. PATENT DOCUMENTS

| 387,338 A * | 8/1888 | Canney ............... 446/192 |
| 3,722,133 A | 3/1973 | Morgan ............... 46/178 |
| 3,811,221 A | 5/1974 | Wilt ..................... 46/180 |
| 3,815,283 A | 6/1974 | Piper .................... 46/178 |
| 3,955,313 A * | 5/1976 | Faulk ................... 446/208 |
| 4,048,750 A | 9/1977 | Wolfe ................... 46/180 |
| 4,179,845 A | 12/1979 | Jacob ................... 46/178 |
| 4,211,031 A * | 7/1980 | Gambino ............. 446/208 |
| 4,637,154 A | 1/1987 | Laubach .................. 43/1 |
| 4,764,145 A | 8/1988 | Kirby .................. 446/208 |
| 4,799,913 A | 1/1989 | Wolfe .................. 446/193 |
| 4,976,648 A | 12/1990 | Meline ................. 446/207 |
| 5,061,220 A | 10/1991 | Cooper ................ 446/208 |
| 5,415,578 A | 5/1995 | Jacobsen ............. 446/207 |
| 5,445,551 A | 8/1995 | Ady ..................... 446/209 |
| 5,582,530 A | 12/1996 | Ady ..................... 446/209 |
| 5,735,725 A | 4/1998 | Primos ................ 446/207 |
| 5,785,574 A | 7/1998 | Sears ................... 446/208 |
| 5,885,127 A | 3/1999 | Colyer ................. 446/208 |
| 5,910,039 A * | 6/1999 | Primos et al. ....... 446/207 |
| 6,062,940 A | 5/2000 | Bean ................... 446/193 |

(Continued)

OTHER PUBLICATIONS

Primos 2004 Product Catalog

*Primary Examiner*—Kien Nguyen
(74) *Attorney, Agent, or Firm*—Pedersen & Co., PLLC; Ken J. Pedersen; Barbara S. Pedersen (57) ABSTRACT

A game call system includes a mouthpiece that produces sound by a plurality of reed or membrane portions vibrating against or near a plurality of sound-producing surfaces. Preferably, the game call has two recessed or curved or contoured surfaces on two halves of a generally circular end of the mouthpiece, with an aperture between the two curved/contoured surfaces. These surfaces may be identical, substantially identical, or different, and the reeds or reed portions also may be identical, substantially identical, and or different. Air passes over the reed(s) to create vibrations in the reed(s), and the resulting sound waves pass through the center aperture of the mouthpiece into the resonating chamber of the call, and through any resonating tube or other member that may optionally be present. The multiple sound-producing regions allow for more complex and/or realistic sounds than conventional single sound-producing region and single reed calls.

20 Claims, 5 Drawing Sheets

U.S. PATENT DOCUMENTS

| | | | |
|---|---|---|---|
| 6,179,684 B1 | 1/2001 | Carlton | 446/207 |
| 6,435,933 B1 | 8/2002 | Browne | 446/207 |
| 6,471,563 B1 | 10/2002 | Carlton | 446/202 |
| 6,612,894 B1 | 9/2003 | Carlton | 446/202 |
| 6,709,309 B1 | 3/2004 | Bishop et al. | 446/213 |
| 6,752,681 B1 | 6/2004 | Bean | 446/208 |
| 6,767,270 B1 | 7/2004 | Primos | 446/207 |
| D497,564 S | 10/2004 | Primos et al. | D10/119 |
| 2003/0060121 A1 | 3/2003 | Oathout | 446/202 |
| 2003/0082988 A1 | 5/2003 | Gendron et al. | 446/207 |

\* cited by examiner

WILD GAME CALL

This application claims priority of Provisional Application Ser. No. 60/561,215, filed Apr. 9, 2004, and entitled "Wild Game Call", which is hereby incorporated by reference, and claims priority of Provisional Application Ser. No. 60/488,509, filed Jul. 18, 2003, and also entitled "Wild Game Call".

BACKGROUND OF THE INVENTION

1. Field of the Invention

This invention relates generally to wild game calls, and more particularly to modular game call systems with multiple sound-producing regions and/or multiple vibrating reeds or membranes for imitating natural sounds of game animals.

2. Related Art

In the pursuit of wild game, such as elk, turkey, or coyote, for example, it is highly advantageous to use a call to simulate the various sounds emitted by the animal. This way, the animal may be enticed to come to the hunter. This is particularly so when hunting with a bow or camera and stalking game for short range contact. As elk and other large game animals make a wide array of sounds or calls, it is important that the simulation not only be a true one, but that the hunter be able to render several different calls. Membrane-reed type calls are well known and capable of producing reasonably good sounds. Much effort has been made to make membrane-reed calls that are easy to use, however, many of the resulting calls produce inferior quality sounds. Therefore, in spite of the wide variety of calls that have been developed, there is still a need for improved game calls that produce realistic sounds and that offer the user the flexibility to creatively vary the sounds produced.

Two of the most popular types of prior art call using reeds have mouthpieces with a single reed and a single sound-producing region. A first type places the plane of the reed generally parallel to the longitudinal axis of the mouthpiece, and a second type places the plane of the reed generally perpendicular to the longitudinal axis of the mouthpiece. Examples of game calls of interest include Laubach (U.S. Pat. No. 4,637,154), Ady (U.S. Pat. No. 5,582,530), Morgan (U.S. Pat. No. 3,722,133), Wilt (U.S. Pat. No. 3,811,221), Piper (U.S. Pat. No. 3,815,283), Kirby (U.S. Pat. No. 4,764,145), Meline (U.S. Pat. No. 4,976,648), and Primos (U.S. Pat. No. 5,735,725).

The proliferation of game calls of varying effectiveness has had unforeseen and unintended consequences. For example, the increased use of game calls that do not closely approximate the actual sounds that animals produce has caused game animals to become wary of calls and increasingly able to discriminate between real and artificial calls. This has led to the need for calls better able to reproduce authentic sounding calls. Thus, despite past efforts, there is need for more accurate game calls that are also readily mastered by novice users.

SUMMARY OF THE INVENTION

The invented game call mouthpiece includes a plurality of separate sound-producing regions and one or more vibrating reeds or membranes. The invented mouthpiece preferably has two vibrating membranes on either side of a mouthpiece air inlet, or near two opposing edges of the mouthpiece inlet. Air may be directed between the two membranes into the opening, which is preferably generally in the center of the mouthpiece. In an especially-preferred embodiment, two sound-producing regions are generally co-planar and perpendicular to the length of the mouthpiece, and the two regions are radially opposed on a generally circular mouthpiece end surface.

The two sound-producing regions may be substantially or identically the same, in which case, the preferred inlet of the game call may be described as "symmetrical." Alternatively, the two sound-producing regions may be different, to produce different or more complex sounds. The plurality of vibrating reeds or membranes may be separate pieces, or multiple areas of a single piece, vibrating independently of substantially independently on different areas of the mouthpiece. Most preferably, the reed is a single piece with two portions vibrating on two opposing sides or regions of the mouthpiece.

DETAILED DESCRIPTION OF THE INVENTION

Referring to the Figures, there are shown several, but not the only, embodiments of the invention. The preferred embodiment may be called a "two-sided" call, in that it comprises two separate reed portions vibrating against or near two separate sound-producing surfaces. While the preferred reed portions may be portions of a single reed unit, and the preferred sound-producing surfaces may be connected to each other, still said reed portions and said surfaces work independently or substantially independently, and so may be called "separate." Preferably, two reed portions vibrate on either side of the mouthpiece with portions of the reed(s) vibrating over structure near an aperture through the mouthpiece that leads to the hollow interior of the mouthpiece. Also, portions of the reed(s) may vibrate over the aperture itself.

The preferred game call relates to the group that has multiple sound-producing regions generally perpendicular to the length of the mouthpiece. Referring to FIGS. 1–7, there are shown several, but not the only, embodiments of the invented wild game call with either a single-piece reed or two reeds installed on the air-inlet end of the mouthpiece. The two "sides" of the mouthpiece inlet and two membranes may be substantially identical and placed opposite one another to be mirror images relative to the centerline. Therefore, the inlet of the game call mouthpiece may be called "bilaterally symmetrical" in respect to the two "sides" divided by horizontal plane H, as shown in FIG. 3. Similarly, the inlet of the game call mouthpiece may be "bilaterally symmetrical" in respect to the two "ends" divided by vertical plane V, also shown in FIG. 3. Alternatively, the two sides and/or the two ends may be different from each other in contour, curvature, and size of the surfaces and aperture.

Figure 1:
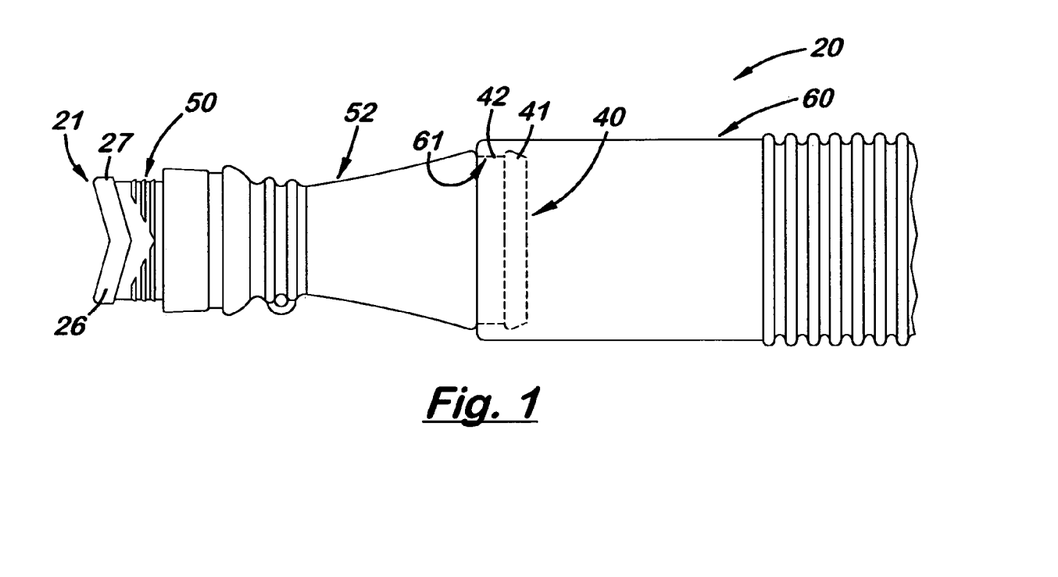
FIG. 1 is a side view of one embodiment of the invented game call mouthpiece shown attached to one end of a resonating tube.
Figure 2:
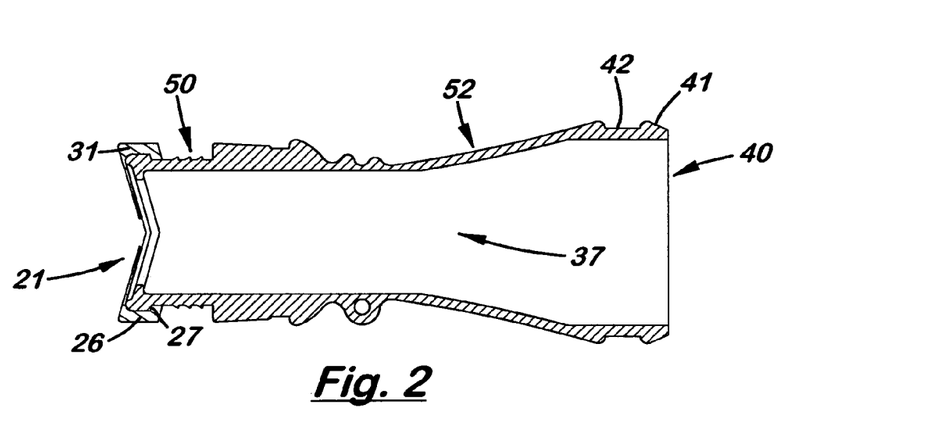
FIG. 2 is a longitudinal cross-sectional view of the embodiment of FIG. 1 with a reed added.
Figure 3:
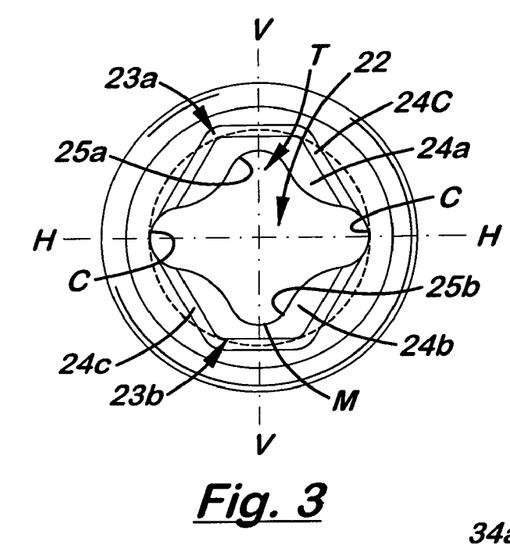
FIG. 3 is an inlet end view of the embodiment of FIGS. 1 and 2, without the reed.

Referring to FIGS. 1 and 2, the preferred embodiment of the invented game call mouthpiece is generally an elongated, hollow, tubular shape of various diameters along its length. At its proximal end is inlet end 21, which preferably receives reed(s)/membrane(s) over and/or near cooperating curved/contoured surfaces. Moving distally from end 21, one may see necked-down area 50, hand-grasp area 52, and outlet end 40.

Outlet end 40 of mouthpiece 20 optionally may be adapted for attachment to a resonating tube 60 or other resonating member. Connection to tube 60 may be done, for example, by distal end 40 snapping into the resonating tube 60 so that annular ridge 41 and circumferential groove 42 are frictionally retained by cooperating lip 61 in resonating tube 60.

The inlet end 21 is preferably cylindrical and sized appropriately for placement of the user's lips gently on the inlet end, typically on the membrane portions (38A, 38b). The proximal end of the inlet end 21 preferably comprises structure that assists in receiving the reed(s) or attaching the reeds to the inlet end 21. This structure may be, for example, circumferential flange 26 that extends radially outward to define circumferential shoulder 27. When the preferably elastic membrane(s) 30 is/are positioned on the call, a portion of membrane 30 extends over the flange 26 and grips the shoulder 27, as illustrated to best advantage in FIGS. 2, 6, and 7.

The proximal surface of the inlet end 21 comprises two opposing shelves 23a and 23b. (Throughout the application, "a" and "b" in callout numbers refer to pieces on the top and bottom halves of mouthpiece 20, respectively, in the views of FIGS. 3–7.) Preferably, shelves 23a and 23b are shown in the Figures to be substantially identical and placed in mirror symmetry on opposite sides of inlet end 21. Having the shelves approximately 180 degrees apart allows the user to conveniently place an upper lip on or above one of the shelves and the other lip gently on or below the other shelf, for example. Alternative embodiments may include shelves that are not identical and/or that are not exactly opposing. For example, shelves may be positioned about 150–180 degrees apart. Between, and defined by the edges 25a and 25b of the shelves, is aperture 22, which opens into the hollow interior 37 of the mouthpiece, which interior 37 serves as a resonating chamber. In the preferred embodiment, shelves 23a and 23b cover about 50–75% of the cross-sectional area of the inlet end 21.

Preferred edges 25a and 25b curve inwardly from their midpoints M to points about 45 degrees on each side of the midpoints, and then curve outwardly to their corners C. Other curved or straight edges may be used. Shelves 23a and 23b, which are generally perpendicular to the length of the mouthpiece, include concave areas 24a and 24b, which extend from ledge 24c to edge 25a and 25b. Although concave areas 24a and 24b are generally semi-circular, it is to be understood that other sloping, recessed, and/or curving areas may alternatively be used. As shown to best advantage in FIGS. 1, 2, and 6 and 7, the generally concave or sloping nature of preferred shelves 23a and 23b, creates a shallow "V" shape in inlet end 21 when viewed from the side.

The two opposed shelves 23a and 23b are the surfaces which are believed to cooperate with multiple reed or reed portions, to create the complex and natural sounds of the mouthpiece, and, hence the slope, recess, and/or curvature of the shelves may be adjusted to produce different sounds. The membrane or other reed portions are believed to vibrate against and near at least portions of the shelves.

Figure 5:
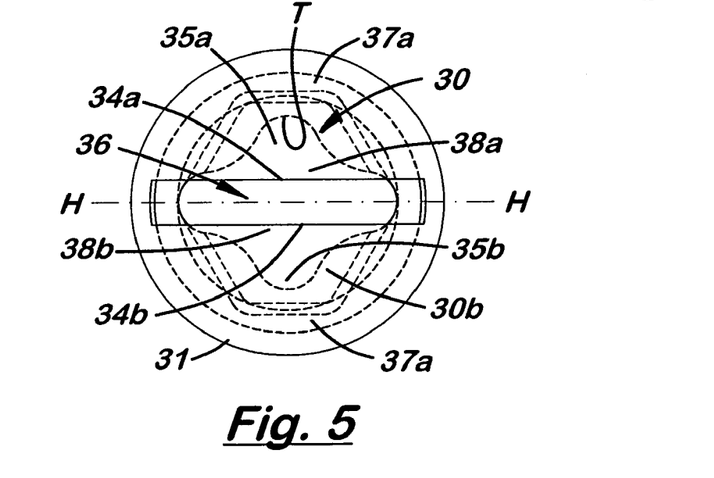
FIG. 5 is an inlet end view of the embodiment of FIGS. 1–4, shown with a one-piece reed installed over the inlet end of the mouthpiece.
Figure 6:
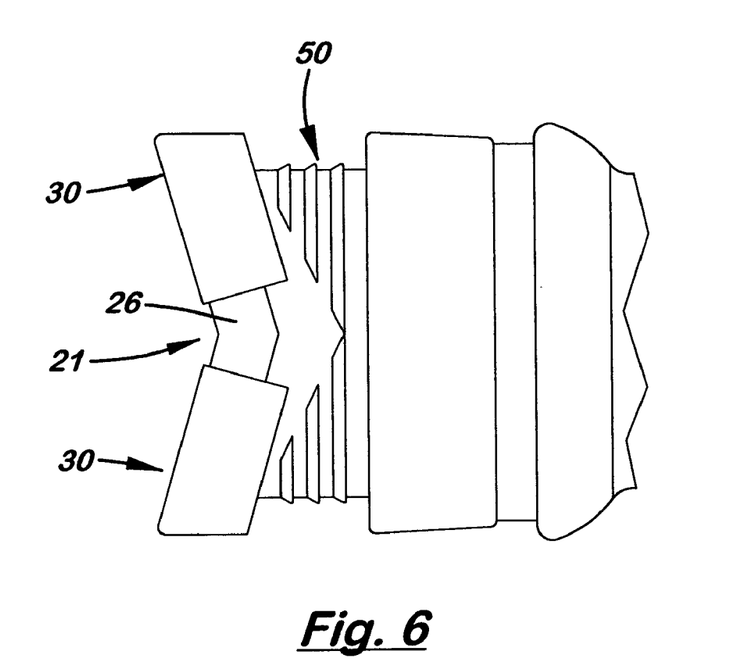
FIG. 6 is an enlarged side view of the inlet end of the embodiment of FIGS. 1–5, shown with the two-piece reed of FIG. 4 installed.
Figure 7:
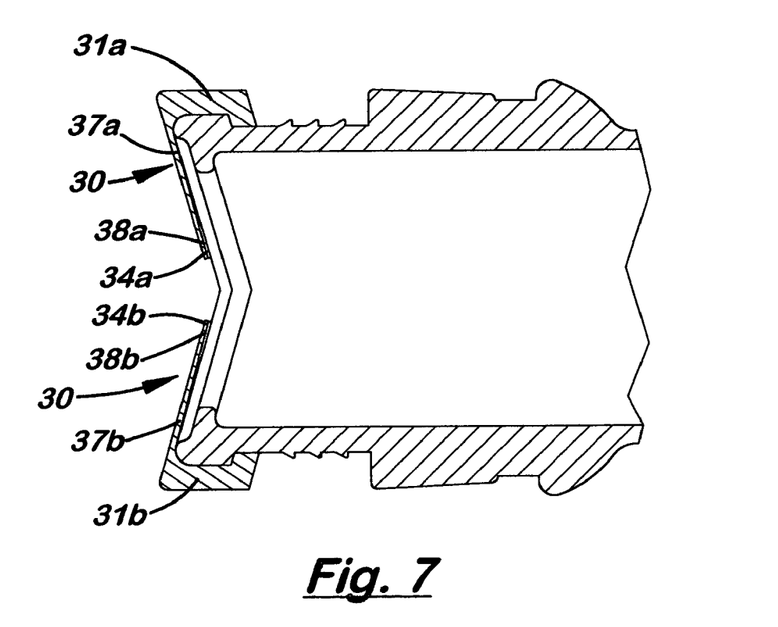
FIG. 7 is an enlarged cross-sectional view of the embodiment of FIGS. 1–6, shown with a reed installed.

The reed structure may be provided by a one-piece reed unit, as shown in FIG. 5, which may be installed over the end of the mouthpiece as illustrated in FIGS. 2 and 7. The one-piece reed may have an elastic ring 31 extending all the way around the shoulder 27 may have two thin, vibrating membrane portions 35a and 35b, each extending over its respective shelf 23a or 23b, and across part of the aperture 22 to the extent that its vibrating edges 34a and 34b surround and define a reed aperture 36, through which air may pass into the mouthpiece. The reed aperture 36 is preferably located generally centrally on the inlet end, symmetrically positioned around the horizontal center plane H of FIG. 13. In the one-piece reed unit, vibrating membrane portion 35a and its edge 34a preferably vibrate independently from vibrating membrane portion 35b and its edge 34b.

Figure 4:
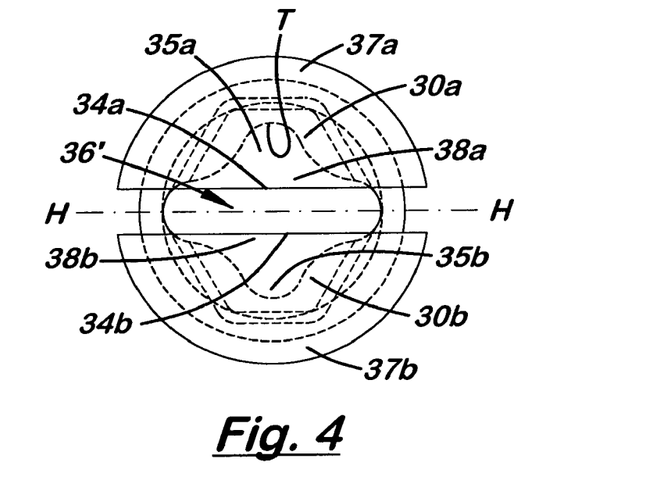
FIG. 4 is an inlet end view of the embodiment of FIGS. 1–3, shown with a two-piece reed installed over the inlet end of the mouthpiece.

Alternatively, as shown in FIG. 4, a two-piece design may be used, wherein two separate reeds are attached over their respective halves of the inlet end 21. Like the one-piece unit, the two separate reeds attach to the mouthpiece, preferably at their outer perimeters, and have thin, vibrating membranes 35a and 35b that each extend over its respective shelf 23a or 23b (preferably covering the entirety of the shelves) and across part of the aperture 22 to the extent that the vibrating edges of the membranes define a space 36' in between the reed portions through which air may pass into the mouthpiece. This space 36' is preferably located generally centrally on the inlet end, symmetrically positioned around the horizontal center plane H. In the two-piece reed design, vibrating membrane portion 35a and its edge 34a preferably vibrate independently from vibrating membrane portion 35b and its edge 34b.

It may be understood that, in the case of the single-piece reed unit, such a reed will elastically grab the inlet end 21, or other tics, straps, adhesive, or other fasteners may be used. In the case of two-piece embodiments, it may be understood that the reeds may not elastically grab the end 21, so alternative attachment means may be used, such as ties or straps, adhesive, hooks, fasteners or other devices that hold the reeds on the mouthpiece without significant interference with the vibrating membranes. The elastic fit, or other attachment of the reed/membranes to the mouthpiece, preferably prevents the membranes from sliding on the mouthpiece.

In use, free edges 34a and 34b and the areas of the reed(s) near the edges 34a and 34b tend to vibrate in the air, without touching any surface, as these edges extend across the aperture in the mouthpiece and/or extend across the shelf surfaces, adjacent to but slightly distanced from, the shelf surfaces. It is believed that the optimum sounds occur with the reed(s) vibrating near but not touching the shelf surfaces. While vibrating membrane portions 35a and 35b may contact support shelves 23a and 23b, either during use when the membrane is vibrating, or even when not in use, the preferred operation and sounds result from the user blowing air across/against the reed(s) and the reed(s) vibrating above the shelf surfaces, so that air movement around the reed(s), and between the reed(s) and the shelf surfaces, creates the preferred sounds.

Generally, one example of reed(s) placement is shown in the Figures, but other placement of the reed(s) relative to the surfaces of the mouthpiece may also be operational and within the scope of the invention. For example, the reed(s) may be placed on the mouthpiece so that the free edges of the reed(s) (34a and 34b) are above, behind, or in front of the perimeter edge(s) 25a, 25b of the shelf surfaces. While FIGS. 4 and 5 illustrates reed(s) that extend past the edges 25a, 25b, other embodiments may includes reed(s) that do not extend so far, such as reed(s) that only extend over the preferred generally U-shaped space (T in FIGS. 3–5) defined by the curved perimeter edge of the shelf.

Further, the free edges 34a, 34b of the reed(s) may be a generally straight, as shown in the Figures, but may also be other shapes. For example, the free edges may themselves be curved in various shapes, generally matching the contour/curve of the edges 25a, 25b of the shelf surfaces or other contours/curves not shown.

Membrane 30 may comprise relatively thicker portions 37a and 37b and relatively thinner portions 38a and 38b, or may have a constant-thickness. In a varying thickness embodiment, membrane 30 tends to be thinner closer to edges 34a and 34b.

Figure 8A:
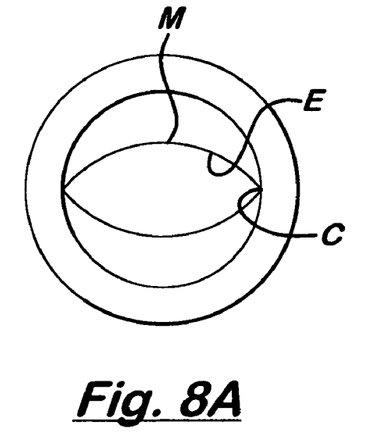
FIGS. 8A–C are schematic side views of alternative embodiments wherein the sound-producing regions are at different angles to the longitudinal axis L of the mouthpiece, and wherein the arrows illustrate air flow.
Figure 8B:
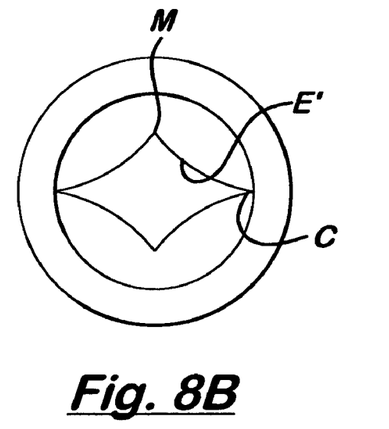
Figure 8C:
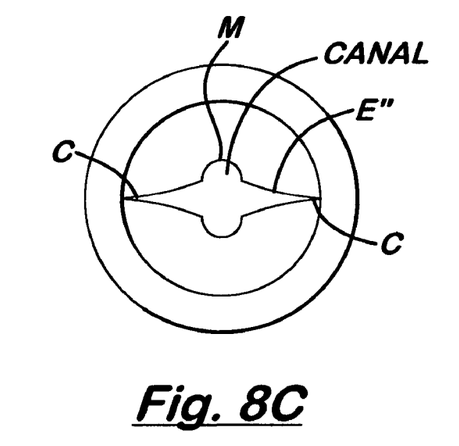
Figure 8D:
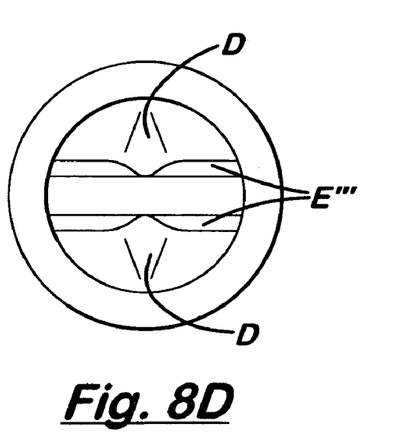

Although FIGS. 1–7 portray shelves each with a gradually-curving U-shaped perimeter edge and with a sloped or concave top surface, many shapes and contours of shelves may be used. For example, FIGS. 8A–8D schematically illustrate some of many alternative shelf shapes and contours. FIG. 8A illustrates a shelf perimeter edge E that is smoothly curved between its midpoint M and corners C, but which does not change curve direction (as does the perimeter edge of FIGS. 3–5) at about 45 degrees on each side of the midpoints M. FIG. 8B illustrates an edge E' that curves outward from its midpoint M to both corners C. FIG. 8C illustrates an edge E" that forms a narrow canal near the midpoint M that passes all the way through the shelf from top to bottom. FIG. 8D illustrates a shelf with a centrally-located depression D that slopes downward toward the perimeter edge E''' but does not pass through the shelf from top to bottom. Other depressions, troughs, canals, or contours may also be provided on the shelf surfaces, as desired for creating various sounds. Preferably, the various shelf surfaces shapes, contours, and recesses are designed in such a way as to provide at least some space between the reed and the top surface of the shelf, in which space the reed vibrates and, and, in cooperation with the contours and recesses, creates complex and life-like sounds.

The many variables associated with the size, shape, and contour of the shelves, the size, shape and thickness of the membrane reed, the spacing between the membrane and the shelves, and the portion of the membranes extending beyond the edges of the shelves, all contribute to the rich and complex sound of the mouthpiece. For example, these variables may be adjusted to create higher quality tones and also simulate the low, raspy sound and "growl" of a bugling bull elk.

Other types of reeds and membranes may be used. For example, sheet(s) of membrane material may be placed across inlet end 21 and held in place with a tight frictional fastener, such as a rubber band around necked-down area 50. The preferred membrane materials may be made of materials popular in other conventional elk calls, such as a latex film.

Figure 9A:
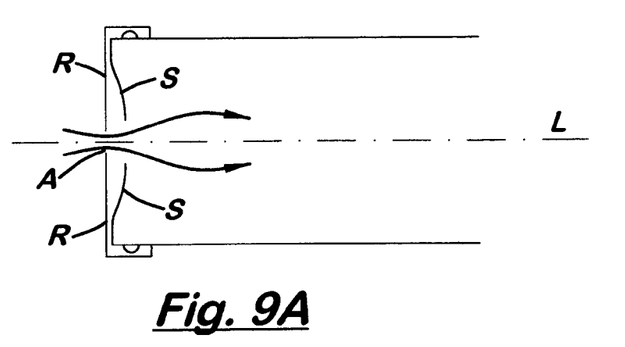
Figure 9B:
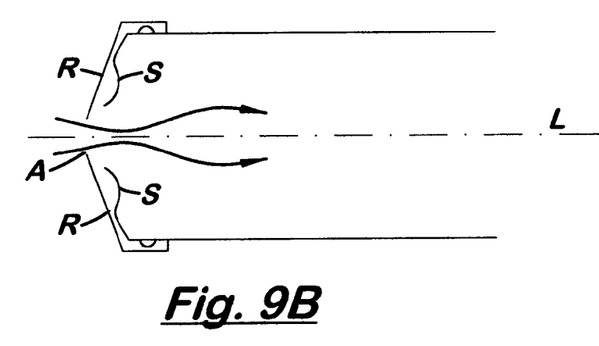
Figure 9C:
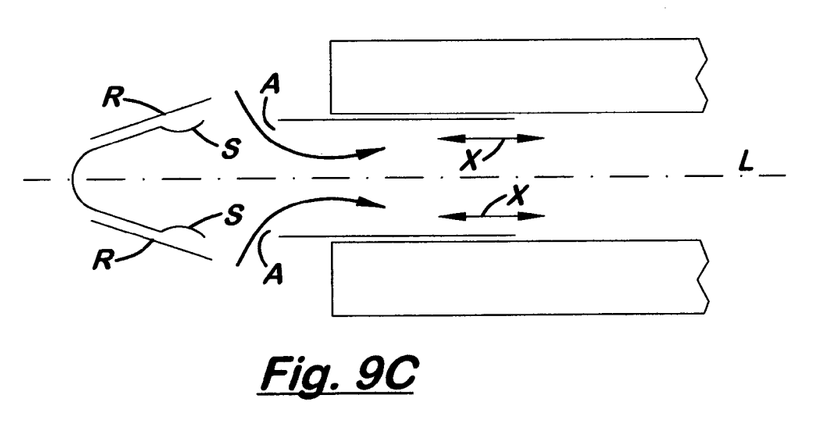

The preferred embodiment has herein been described as having sound-producing surfaces or "shelves" that are generally perpendicular to the longitudinal axis of the mouthpiece. The embodiments shown in FIGS. 1–7 include shelves that fall within the "generally perpendicular" term but that form a shallow V-shape or other generally concave side profile. The invention may include other embodiments wherein the surfaces cooperating with the reed(s), or affecting air moved by the vibrating reed(s), lie at different angles relative to the longitudinal axis. For example, the shelves S shown in FIG. 9A are more perpendicular to axis L. The shelves S in the embodiment shown in FIG. 9B extend outward to form a more convex shape, but still with a single, generally central aperture A. The shelves in FIG. 9C are slanted to be more parallel than perpendicular to axis L, in which case it may become desirable to have the reed(s) R extend over apertures A on both sides that lead to the hollow interior of the mouthpiece. One may see that there may be a continuum of sound-producing surface angles between generally parallel to axis L and generally perpendicular to axis L.

The inventors prefer that calls within the categories of "generally parallel to the axis L" of the mouthpiece (for example, calls such as illustrated in FIG. 16C) include a slideable and/or otherwise adjustable mouthpiece. This slideable/adjustable mouthpiece feature may include adaptations for the sound-producing surfaces, and/or the vibrating reed(s), and/or the aperture through which air/sound waves pass into the call body, to slide or adjust between extended/lengthened positions and retracted/shortened positions. In the extended/lengthened positions, the sound-producing surfaces, reed(s), and/or aperture are moved father out from the holder or main body of the mouthpiece, and, hence, from the resonating chamber therein. In the retracted/shortened positions, the sound-producing surfaces, reed(s), and/or aperture are moved closer to the holder or main body of the mouthpiece. Preferably, this adjustability is continuous between the extremes of being far out from, and close in to, the holder/main body, but the adjustability may also be designed to be incremental. This adjustability may allow a call to better fit a particular user's mouth, lips, and teeth, and it may also or instead allow the user to alter and vary the sounds produced by a single call. This is because the adjustability of the mouthpiece may allow the user to adjust his mouth and lip position relative to the apparatus that produces the sounds and may allow the user to control/vary the dynamics of lip pressure, blowing of air, and mouth or tongue movement that may contribute to effective game calling. The preferred, but not the only, adaptation for producing this adjustability feature is shown schematically in FIG. 9C by the arrows X, wherein the mouthpiece portion slides in and out longitudinally relative to the holder/tube. Further, the inventors envision that the invented adjustability feature may be used to great advantage on various game calls, even those that are not "two-sided."

Although this invention has been described above with reference to particular means, materials, and embodiments, it is to be understood that the invention is not limited to these disclosed particulars, but extends instead to all equivalents within the scope of the following claims.

We claim:

1. A game call comprising a mouthpiece having a plurality of separate sound-producing regions, each of said regions comprising a reed portion held on a support surface of the mouthpiece and a recessed surface that is recessed relative to the support surface, wherein each of said reed portions is adapted to vibrate near its respective recess surface independently of the other of said reed portions, wherein said game call has an elongated body with a longitudinal axis and a resonating chamber and said recessed surfaces are generally perpendicular to said longitudinal axis, the game call comprising two of said recessed surfaces with an aperture between said recessed surfaces that is in communication with the resonating chamber.

2. A game call as in claim 1, wherein each of said two recessed surfaces comprises a shelf extending part way across an inlet end of the mouthpiece.

3. A game call as in claim 2, wherein each of said shelves has a curved perimeter edge.

4. A game call as in claim 2, wherein each of said shelves has a straight perimeter edge.

5. A game call as in claim 2, wherein said reed portions are two halves of an elastic reed extending over the inlet end of the mouthpiece.

6. A game call as in claim 2, wherein each of said shelves slopes inward toward the resonating chamber.

7. A game call as in claim 2, wherein each of said shelves comprises a depression near the perimeter edge.

8. A game call as in claim 2, wherein said shelves each have a V-shaped perimeter edge.

9. A game call as in claim 2, wherein each of said shelves has a U-shaped perimeter edge.

10. A game call as in claim 2, wherein said shelves are mirror-images.

11. A game call as in claim 2, wherein each of said shelves has different surface contours.

12. A game call as in claim 1, wherein each of said recessed surfaces has a curved perimeter edge.

13. A game call as in claim 1, wherein each of said recessed surfaces has a straight perimeter edge.

14. A game call as in claim 1, wherein each of said recessed surfaces comprises a depression near the perimeter edge.

15. A game call as in claim 1, wherein each of said recessed surfaces has a U-shaped perimeter edge.

16. A game call as in claim 1, wherein said recessed surfaces are mirror-images.

17. A game call as in claim 1, wherein each of said recessed surfaces has different surface contours.

18. A game call comprising a mouthpiece having a plurality of separate sound-producing regions, each of said regions comprising a reed portion held on a support surface of the mouthpiece and a recessed surface that is recessed relative to the support surface, wherein each of said reed portions is adapted to vibrate near its respective recess surface independently of the other of said reed portions, wherein said reed portions are two halves of an elastic reed extending over the inlet end of the mouthpiece.

19. A game call comprising a mouthpiece having a plurality of separate sound-producing regions, each of said regions comprising a reed portion held on a support surface of the mouthpiece and a recessed surface that is recessed relative to the support surface, wherein each of said reed portions is adapted to vibrate near its respective recess surface independently of the other of said reed portions, wherein each of said recessed surfaces slopes inward toward the resonating chamber.

20. A game call comprising a mouthpiece having a plurality of separate sound-producing regions, each of said regions comprising a reed portion held on a support surface of the mouthpiece and a recessed surface that is recessed relative to the support surface, wherein each of said reed portions is adapted to vibrate near its respective recess surface independently of the other of said reed portions, wherein each of said recessed surfaces has a V-shaped perimeter edge.

* * * * *